US011906635B2

(12) United States Patent
De Wilde et al.

(10) Patent No.: US 11,906,635 B2
(45) Date of Patent: Feb. 20, 2024

(54) METHOD AND SYSTEM FOR RECREATING UNAVAILABLE GNSS MEASUREMENTS

(71) Applicant: Septentrio N.V., Heverlee (BE)

(72) Inventors: Wim De Wilde, Oud-Heverlee (BE); Jean-Marie Sleewaegen, Jette (BE)

(73) Assignee: Septentrio N.V., Heverlee (BE)

(*) Notice: Subject to any disclaimer, the term of this patent is extended or adjusted under 35 U.S.C. 154(b) by 282 days.

(21) Appl. No.: 17/295,836

(22) PCT Filed: Nov. 21, 2019

(86) PCT No.: PCT/EP2019/082099
§ 371 (c)(1),
(2) Date: May 20, 2021

(87) PCT Pub. No.: WO2020/104594
PCT Pub. Date: May 28, 2020

(65) Prior Publication Data
US 2022/0011443 A1 Jan. 13, 2022

(30) Foreign Application Priority Data
Nov. 21, 2018 (EP) ...................... 18207645

(51) Int. Cl.
G01S 19/32 (2010.01)
G01S 19/42 (2010.01)
(Continued)

(52) U.S. Cl.
CPC .............. *G01S 19/32* (2013.01); *G01S 19/21* (2013.01); *G01S 19/426* (2013.01); *G01S 19/43* (2013.01)

(58) Field of Classification Search
CPC ........ G01S 19/04; G01S 19/071; G01S 19/21; G01S 19/215; G01S 19/32; G01S 19/426; G01S 19/43; G01S 19/44
See application file for complete search history.

(56) References Cited

U.S. PATENT DOCUMENTS

| 2005/0203702 | A1 | 9/2005 | Sharpe et al. |
| 2010/0141510 | A1 | 6/2010 | Dai et al. |
| 2011/0279314 | A1 | 11/2011 | Talbot et al. |
| 2019/0110270 | A1* | 4/2019 | Chen ...................... G01S 19/15 |

FOREIGN PATENT DOCUMENTS

| CN | 103163533 A | * | 6/2013 |
| JP | 2007529010 A | | 10/2007 |
| JP | 2010504523 A | | 2/2010 |

OTHER PUBLICATIONS

Y. Yang et al., L1 Backup Navigation for Dual Frequency GPS Receiver, Proceedings of the 16th International Technical Meeting of the Satellite Division of The Institute of Navigation (ION GPS/GNSS 2003), p. 1258-1263 (Year: 2003).*

(Continued)

*Primary Examiner* — Bernarr E Gregory
*Assistant Examiner* — Fred H Mull

(57) ABSTRACT

The invention pertains to a method for recreating unavailable measurements in a GNSS system by producing at least one GNSS parameter estimate Formula (I) at a target carrier frequency ($f_k$), the method comprising at least one of: deriving (1030), from one or more available pseudorange measurements ($P_i$) at respective other carrier frequencies ($f_i$), a pseudorange estimate Formula (II) at said target carrier frequency ($f_k$) and deriving (1040), from said one or more available pseudorange measurements ($P_i$) and one or more available carrier phase measurements ($\varphi_i$) at said respective other carrier frequencies ($f_i$), a carrier phase estimate Formula (III) at said target carrier frequency ($f_k$).

19 Claims, 7 Drawing Sheets

(51) Int. Cl.
*G01S 19/43* (2010.01)
*G01S 19/21* (2010.01)

(56) References Cited

OTHER PUBLICATIONS

A priori. (2007). In R. E. Allen (Ed.), The Penguin English Dictionary (3rd ed.). Penguin. Credo Reference: https://search.credoreference.com/content/entry/penguineng/a_priori/0 (Year: 2007).*
M. C. Martínez-Belda, Single-frequency time and frequency transfer with Galileo E5, 2011 Joint Conference of the IEEE International Frequency Control and the European Frequency and Time Forum (FCS) Proceedings, 6 pages (Year: 2011).*
M. Markovic, Determination of Total Electron Content in the Ionosphere Using GPS Technology, Geonauka, vol. 2(2), p. 1-9 (Year: 2014).*
A priori. (2016). The American Heritage Dictionary of the English Language (6th ed.). Houghton Mifflin. Credo Reference: https://search.credoreference.com/content/entry/hmdictenglang/a_priori/0 (Year: 2016).*
Extended European Search Report from EP Application No. 18207645.5 (filed Nov. 21, 2018), dated May 24, 2019.
International Search Report and Written Opinion from PCT Application No. PCT/EP2019/082099 (filed Nov. 21, 2019), dated Feb. 17, 2020.
Office Action from Japanese Patent App. No. 2021-528385, dated Jul. 25, 2023.

* cited by examiner

METHOD AND SYSTEM FOR RECREATING UNAVAILABLE GNSS MEASUREMENTS

FIELD OF THE INVENTION

The present invention pertains to Global Navigation Satellite Systems (GNSS), and in particular to systems and methods that determine position parameters on the basis of a combination of satellite signals and base station signals.

BACKGROUND

Global Navigation Satellite Systems (GNSS) are widely used to provide position, velocity and time to any user on or near the Earth's surface. A GNSS comprises, among other things, a constellation of multiple navigation satellites (GNSS satellites), which transmit dedicated navigation signals also called "ranging signals". Most known is the Global Positioning System (GPS) developed by the United States of America. Other systems include the European Galileo system, the Russian GLONASS and the Chinese BeiDou system.

Most GNSS satellites transmit multiple ranging signals in various frequency bands. In GNSS receivers, the different frequency bands are first amplified and downconverted to baseband in analog frontend circuits, and the signals from the different satellites are acquired and tracked in dedicated tracking channels. For each tracked signal of each satellite, the receiver computes the so-called pseudorange and carrier phase measurements. These measurements represent the distance to the satellite, albeit biased by the offset of the receiver and satellite clocks and by multiple error sources (atmospheric effects, satellite biases, multipath, . . . ). Carrier phases are more accurate than pseudoranges, but are affected by an ambiguity of an integer number of carrier wavelengths.

High-accuracy GNSS positioning typically relies on pseudorange and carrier phase measurements from more than one frequency bands, and involves operating in differential mode. For example, in the Real-Time Kinematic mode (RTK), a rover GNSS receiver computes its position relative to a base station with known coordinates. To this end, the base station transmits its position and its pseudorange and carrier phase measurements to the rover. With the help of the base station data, the rover can compensate for most of the errors affecting its own measurements. The differential positioning accuracy in multi-frequency RTK mode it at centimeter or even millimeter level.

In Precise Point Positioning, satellite clock and orbit errors and biases are computed by a network of GNSS receivers, and corrections are transmitted to the rover. The rover uses them to correct its own measurements.

In the current state-of-the-art, a rover tracking a particular set of frequency bands must receive measurements or corrections applicable to said set of frequency bands. If the set of frequency bands for which a base station transmits data is not identical to the set of frequency bands tracked by the rover, only the common frequency bands will be corrected, which leads to a decreased accuracy.

There is a need for GNSS receivers that obtain better accuracy when base station data is not available for all the frequency bands tracked by the GNSS receiver.

United States patent application publication no. US 2005/203702 A1 discloses a method for performing backup dual-frequency navigation during a brief period when one of two frequencies relied upon by dual-frequency navigation is unavailable. The method includes synthesizing the code and carrier-phase measurements on the unavailable frequency using the carrier-phase measurements on the retained frequency and a model of ionospheric refraction effects, which is updated when measurements on both frequencies are available. The method of that application can only be used in systems that have access to measurements at both frequencies during normal operation, as it relies on extrapolation during the brief periods of unavailability of one of the frequencies. Hence, the method of that publication cannot be used when the receiver normally tracks only one of said frequencies.

SUMMARY

According to an aspect of the present invention, there is provided a method for recreating unavailable measurements in a GNSS system by producing at least one GNSS parameter estimate ($\widehat{P_k}$, $\widehat{\varphi_k}$) at a target carrier frequency ($f_k$), the method comprising at least one of: deriving, from one or more available pseudorange measurements ($P_i$) at respective other carrier frequencies ($f_i$), a pseudorange estimate ($\widehat{P_k}$) at the target carrier frequency ($f_k$); and deriving, from the one or more available pseudorange measurements ($P_i$) and one or more available carrier phase measurements ($\varphi_i$) at the respective other carrier frequencies ($f_i$), a carrier phase estimate ($\widehat{\varphi_k}$) at the target carrier frequency ($f_k$).

The present invention is based inter alia on the insight of the inventors that, if some conditions are met in the signal generation in the satellite, it is possible to derive pseudoranges and carrier phases for a given frequency band from measurements made on one or more other frequency bands. The said one or more "other frequency bands" are different from the given target frequency band. In the method of the present invention, there is no need to have access to prior measurements in the target frequency band.

It is an advantage of the method according to the present invention that it enables differential operation in case the base and rover receivers do not track the same set of signals. It is a further advantage of the method according to the present invention that it allows to continue getting measurements for a frequency band that is (temporarily) jammed or unavailable for any reason. In an embodiment of the method according to the present invention, the deriving (1030) of the pseudorange estimate ($\widehat{P_k}$) comprises adding to one of the one or more pseudorange measurements ($P_i$) a first correction term that is a function of the ratio of the corresponding other carrier frequency ($f_i$) to the target frequency ($f_k$).

This embodiment is based on the insight that, up to an acceptable degree of approximation, the difference between the target pseudorange ($P_k$) and the available pseudorange ($P_i$) can be expressed as a satellite-independent function of the ratio $$\frac{f_i}{f_k}.$$

In a particular embodiment, the first correction term is proportional to the corresponding ionospheric delay ($I_i$) and a factor defined as the square of the ratio minus 1.

The inventors have found that, up to an acceptable degree of approximation, the difference between the target pseudorange ($P_k$) and the available pseudorange ($P_i$) can be expressed as the product $$\left(\frac{f_i^2}{f_k^2}-1\right)I_i,$$

whereby $I_i$ is the applicable ionospheric delay.

In an embodiment of the method according to the present invention, the deriving of the carrier phase estimate ($\widehat{\varphi}_k$) comprises adding to one of the one or more carrier phase measurements ($\varphi_i$) a second correction term that is a function of the difference between the target carrier frequency ($f_k$) and the corresponding other carrier frequency ($f_i$).

This embodiment is based on the insight that, up to an acceptable degree of approximation, the difference between the target carrier phase ($\varphi_k$) and the available carrier phase ($\varphi_i$) can be expressed as a satellite-independent function of the difference $f_i - f_k$.

In a particular embodiment, the second correction term includes a term that is the product of: the corresponding pseudorange measurement ($P_i$), the difference between the target carrier frequency ($f_k$) and the corresponding other carrier frequency ($f_i$), and the inverse of the speed of light (c).

In a particular embodiment, the second correction term includes a term that is the product of: the corresponding ionospheric delay ($I_i$), the square of the difference between the target carrier frequency ($f_k$) and the corresponding other carrier frequency ($f_i$), and the inverse of the product of target carrier frequency ($f_k$) and the speed of light (c).

The inventors have found that, up to an acceptable degree of approximation, the difference between the target carrier phase ($\varphi_k$) and the available carrier phase ($\varphi_i$) can be expressed as $$\frac{f_k - f_i}{c}P_i - \frac{(f_k - f_i)^2}{cf_k}I_i.$$

In an embodiment of the method according to the present invention, the deriving steps do not rely on any a-priori satellite-dependent term.

It is an advantage of this embodiment that it requires no a-priori knowledge about the involved satellites, as the derivation does not rely on any satellite-dependent term that is not available from the signal(s) transmitted by the satellite in the available band(s) (i.e., on frequency $f_i$).

In an embodiment of the method according to the present invention, the target carrier frequency ($f_k$) lies within 100 MHz from the other carrier frequencies ($f_i$).

The inventors have found that the conversion formulas of the present invention are especially interesting when the source frequency $f_i$ and target frequency $f_k$ are close to each other, as for example is the case when the signals are part of an AltBOC modulation, because the coefficient of the $P_i$ and the $I_i$ terms is particularly small in that case.

In an embodiment of the method according to the present invention, an inter-frequency bias between a signal at the target carrier frequency ($f_k$) and signals at the respective other carrier frequencies ($f_i$) is satellite independent.

It is an advantage of this embodiment that it can be applied between source/target tracking signals of different satellites.

According to an aspect of the present invention, there is provided a method for determining a location using GNSS, the method comprising: receiving respective tracking signals from a GNSS satellite in a first set of frequency bands; receiving respective correction signals from a base station in a second set of frequency bands; for at least one target frequency band present in the first set but not in the second set, computing a simulated correction signal from at least one correction signal received in a different frequency band, by applying the deriving steps as described above; and computing a location parameter on the basis of the tracking signal received in the target frequency band and the corresponding simulated correction signal.

According to an aspect of the present invention, there is provided a method for determining a location using GNSS, the method comprising: receiving respective tracking signals from a GNSS satellite in a first set of frequency bands; receiving respective correction signals from a base station in a second set of frequency bands; for at least one target frequency band present in the second set but not in the first set, computing a simulated tracking measurement from at least one tracking signal received in a different frequency band, by applying the deriving steps according to any of the preceding claims; and computing a location parameter on the basis of the simulated tracking measurement and the corresponding correction signal received in the target frequency band.

According to an aspect of the present invention, there is provided a method for countering jamming of a GNSS system, the method comprising: receiving respective tracking signals from a GNSS satellite in a first set of non-jammed frequency bands; and for at least one jammed frequency band, computing a simulated tracking measurement from one or more received tracking signals in the set of non-jammed frequency band, by applying the deriving steps as described above.

According to an aspect of the present invention, there is provided a computer program product comprising code means configured to cause a processor, when executed, to carry out the steps of the method as described above.

According to an aspect of the present invention, there is provided a system for determining a location using GNSS, the system comprising: first receiving means configured for receiving tracking signals from a GNSS satellite in a first set of frequency bands; second receiving means configured for receiving respective correction signals from a base station in a second set of frequency bands; and processing means configured to carry out the method described above on the tracking signals and the correction signals.

The technical effects and advantages of embodiments of the computer program product and the GNSS receiver according to the present invention correspond, mutatis mutandis, to those of the corresponding embodiments of the method according to the present invention.

BRIEF DESCRIPTION OF THE FIGURES

These and other technical features and advantages of embodiments of the present invention will now be described in more detail with reference to the accompanying drawings, in which.

DETAILED DESCRIPTION OF EMBODIMENTS

As stated above, most GNSS satellites transmit multiple ranging signals in various frequency bands. For example, the latest generation of GPS satellites transmits on the L1, L2 and L5 carriers at 1575.42 MHz, 1227.6 MHz and 1176.45 MHz respectively. Galileo satellites transmit on the E1, E5a, E5b and E6 carriers at 1575.42 MHz, 1176.45 MHz, 1207.14 MHz and 1278.75 MHz respectively, with E5a and E5b transmitted as a single wideband AltBOC modulation.

To optimize cost, size or power consumption, many GNSS receivers do not track all frequency bands transmitted by a given satellite. For example, a Galileo receiver may be designed to only track the Galileo E1 and E5b signals. Such a receiver will only generate pseudoranges and carrier phases for E1 and E5b.

Figure 1:
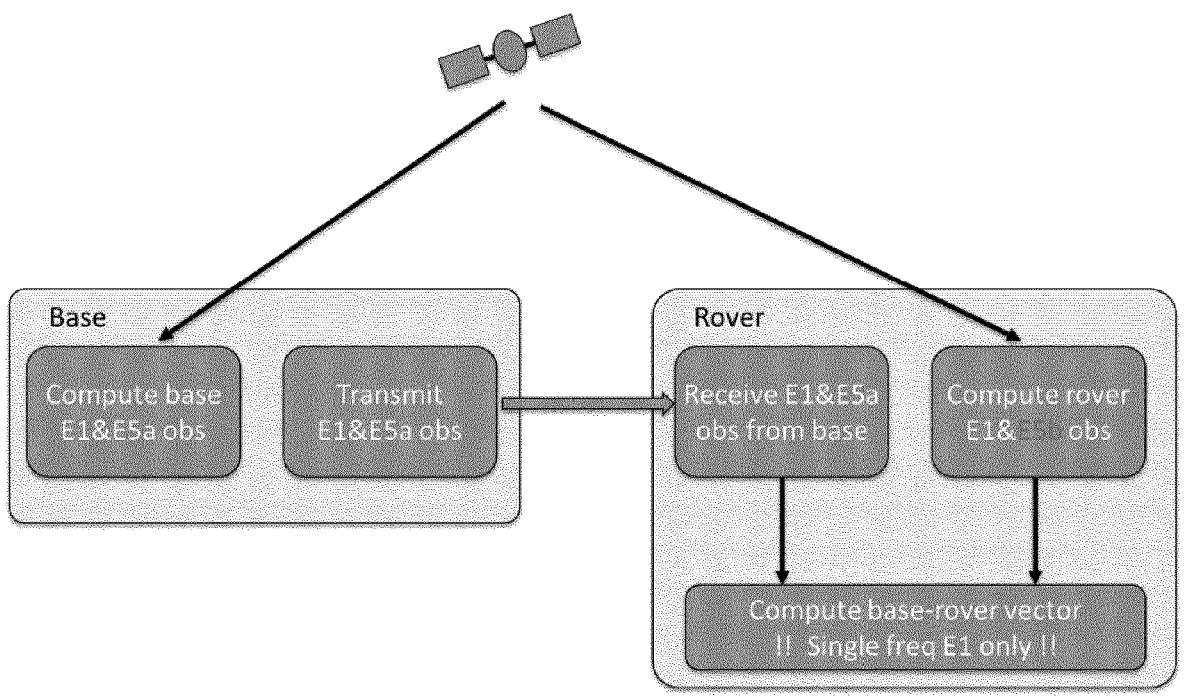
FIG. 1 exemplifies a mismatch between frequencies tracked by a base station (Galileo E1 and E5a) and a rover (Galileo E1 and E5b)

A rover tracking frequency bands i and j must receive measurements or corrections applicable to frequency bands i and j. For example, if an RTK rover is tracking the Galileo E1 and E5b signals, it must receive base station data for the E1 and E5b signals. If the base station is transmitting data for E1 and E5a instead, only the E1 measurements will be usable and the rover will have to revert to a lower-accuracy single-frequency solution. This is illustrated in FIG. 1.

It is an object of embodiments of the present invention to at least partially overcome this problem. The inventors have found that, if some conditions are met in the signal generation in the satellite, it is possible to derive pseudoranges and carrier phases for a given frequency band from measurements made on one or more other frequency bands.

Figure 2:
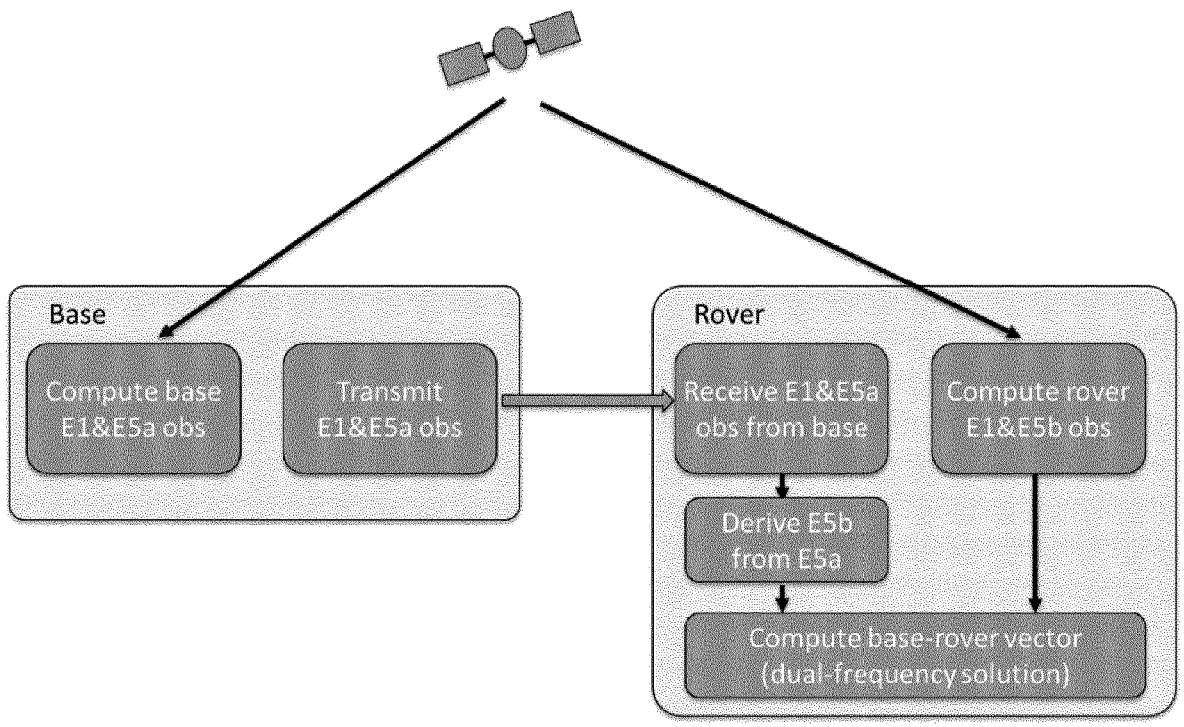
FIG. 2 schematically represents an alignment of measurements received from the base to the measurements computed by the rover.

For example, an embodiment of the receiver according to the invention will be able to convert base station measurements from the E5a band into measurements from the E5b band, as illustrated in FIG. 2. In the illustrated embodiment, the core of the invention is represented by the "Derive E5b from E5a" block, which emulates E5b measurements from the E5a measurements received by the base station, making it possible to compute a dual-frequency PVT.

Figure 3:
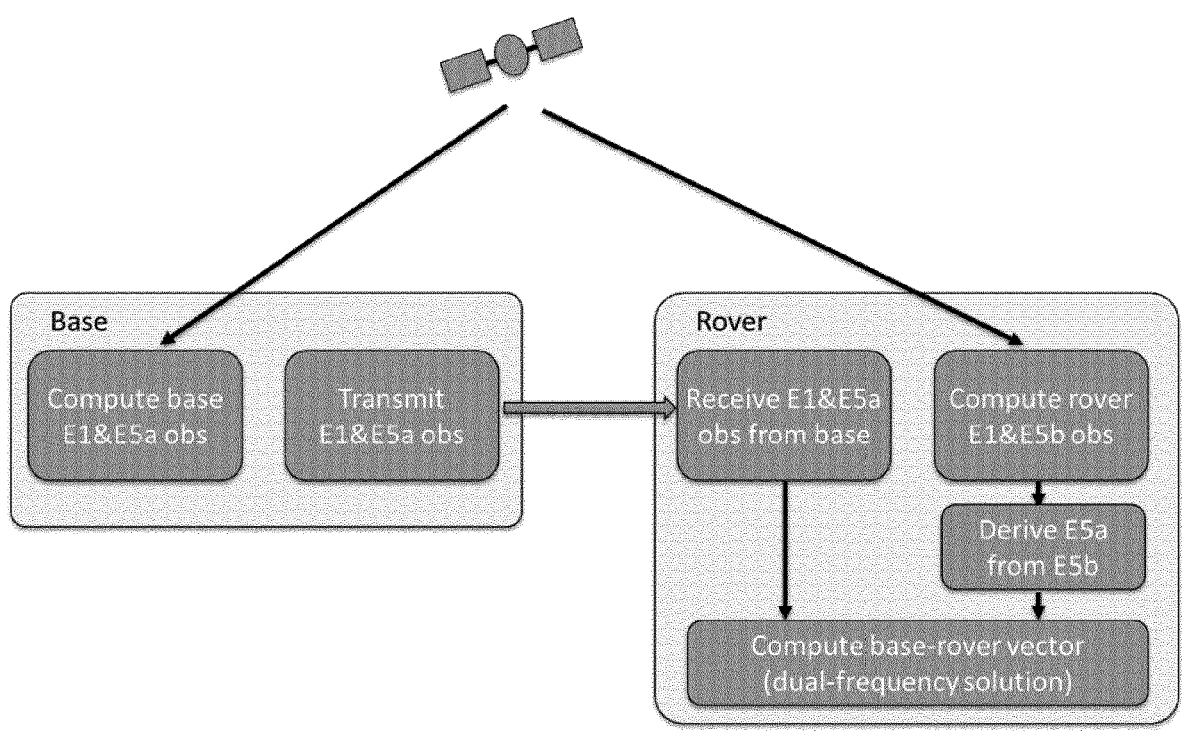
FIG. 3 schematically represents an alignment of measurements from the rover to those received from the base.

In another exemplary embodiment, illustrated in FIG. 3, the E5b measurements from the rover are converted to E5a.

Physically, the possibility to derive pseudoranges and carrier phases for a given frequency band from measurements made on one or more other frequency bands, is related to the fact that a strong correlation exists between the measurements made on different frequency bands of a given satellite. The main sources of differences between measurements on different frequency bands are known to be the ionosphere, which is a dispersive medium, and the inter-frequency biases of the receiver and satellite.

The ionosphere can often be predicted or measured, or even neglected in some cases. The receiver biases are caused by delays and phase shifts in the receiver hardware; they are common to all satellites and therefore do not contribute to positioning errors. Hence, from the point of view of exploiting the correlation between measurements in different frequency bands, the satellite inter-frequency biases are the most challenging contribution to the observed deviation.

According to the prevailing view in the art, satellite inter-frequency biases (i.e., the delays and phase shifts in the satellite hardware) are assumed to be satellite dependent, possibly variable over time, and specific to each frequency band. The existence of satellite inter-frequency biases is the main reason why rovers need to receive measurements or corrections from the same frequency bands as the ones they are tracking.

However, the inventors have found that, contrary to common belief, satellite inter-frequency biases are not always satellite dependent. For example, the inter-frequency biases between the Galileo E5a, E5b and E5-AltBOC signals are, surprisingly, essentially satellite independent. This results from the fact that these signals are transmitted as a single wideband modulation, and are generated digitally in the satellite in a deterministic manner.

Embodiments of the invention exploit this property. Thus, if signals i and k are transmitted by the satellites in such a way that their inter-frequency biases is satellite independent, it is possible to predict what measurements from signal k will be even if only measurements from signal i are available. The invention is particularly useful to align the measurements from a rover to the measurements received from a base station or a network, in case the rover does not track the same signals as those available from the base or the network.

Figure 4:
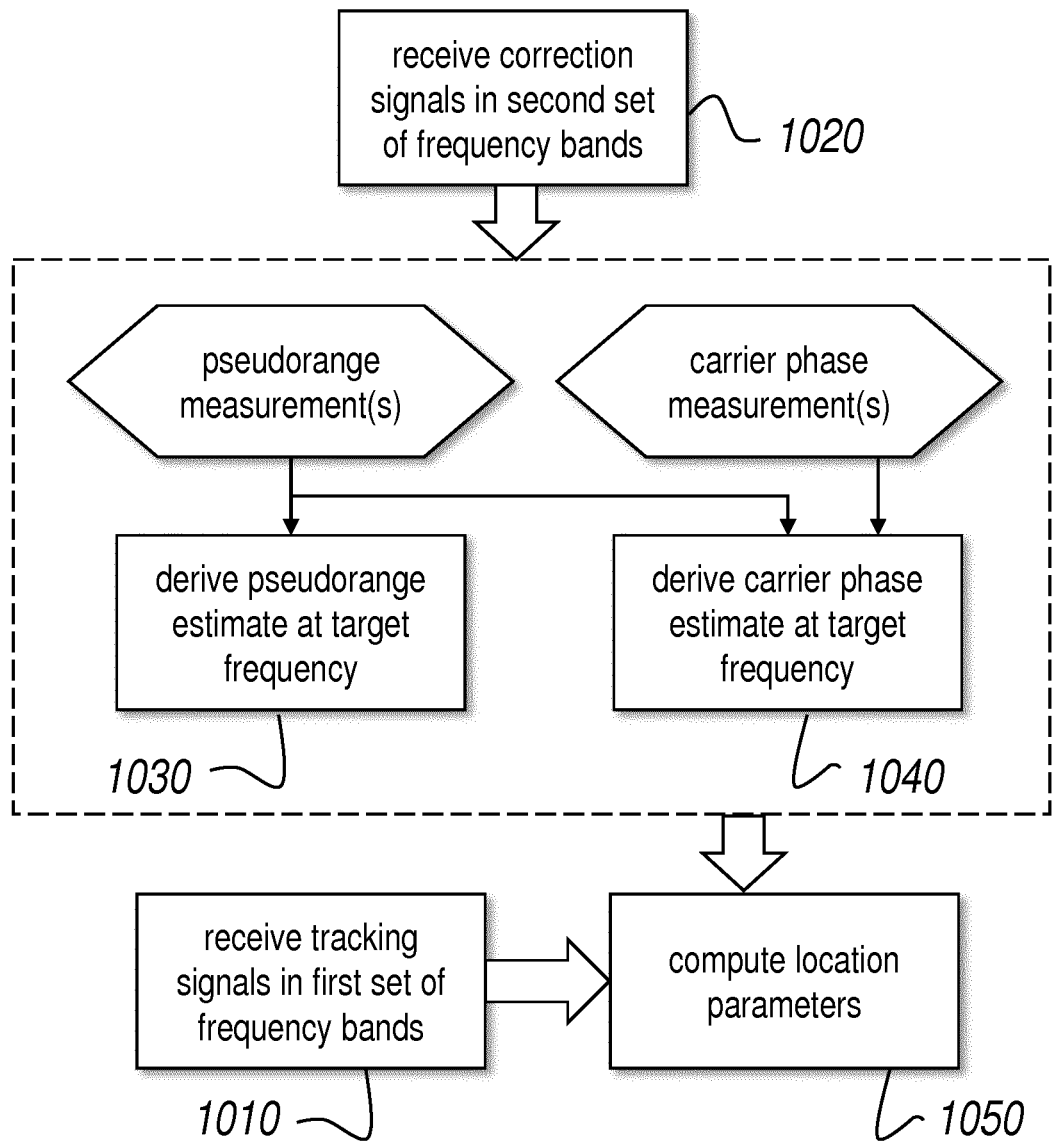
FIG. 4 provides a flow chart of an embodiment of the method according to the present invention.

FIG. 4 provides a flow chart of an embodiment of the method according to the present invention. The method provides a way of deriving at least one GNSS parameter estimate ($\widehat{P_k}$, $\widehat{\varphi_k}$) and at a target carrier frequency ($f_k$) from one or more available pseudorange measurements ($P_i$) and carrier phase measurements ($\varphi_i$) at respective other carrier frequencies ($f_i$).

The method may in particular comprise deriving 1030 a pseudorange estimate ($\widehat{P_k}$) at said target carrier frequency ($f_k$) by adding to one of said one or more pseudorange measurements ($P_i$) a first correction term that is a function of the ratio of the corresponding other carrier frequency ($f_i$) to the target frequency ($f_k$).

The method may in particular comprise deriving 1040 a carrier phase estimate ($\widehat{\varphi_k}$) at said target carrier frequency ($f_k$) by adding to one of said one or more carrier phase measurements ($\varphi_i$) a second correction term that is a function of the difference between the target carrier frequency ($f_k$) and the corresponding other carrier frequency ($f_i$).

The deriving of at least one GNSS parameter estimate as described above can be used in a method for determining a location using GNSS.

In the scenario schematically illustrated in FIG. 2 and further detailed in FIG. 4, such a method may comprise receiving respective tracking signals from a GNSS satellite in a first set of frequency bands 1010; receiving respective correction signals from a base station in a second set of frequency bands 1020; for at least one target frequency band present in said first set but not in said second set, computing a simulated correction signal from at least one correction signal received in a different frequency band, by applying the deriving steps 1030; 1040 as described above; and computing 1050 a location parameter on the basis of said tracking signal received in said target frequency band and said corresponding simulated correction signal.

In the scenario schematically illustrated in FIG. 3 (not represented in FIG. 4), such a method may comprise receiving respective tracking signals from a GNSS satellite in a first set of frequency bands 1010; receiving respective correction signals from a base station in a second set of frequency bands 1020; for at least one target frequency band present in said second set but not in said first set, computing a simulated tracking measurement from at least one correction signal received in a different frequency band, by applying the deriving steps 1030; 1040 as described above; and computing 1050 a location parameter on the basis of said simulated tracking measurement and said corresponding correction signal received in said target frequency band.

The deriving of at least one GNSS parameter estimate as described above can be used in a method for countering jamming in a GNSS system. In that application, an embodiment may comprise receiving respective tracking signals from a GNSS satellite in a set of non-jammed frequency bands; and for at least one jammed frequency band, computing a simulated tracking measurement from one or more received tracking signals in the set of non-jammed frequency bands, by applying the deriving steps 1030; 1040 as described above.

Figure 5:
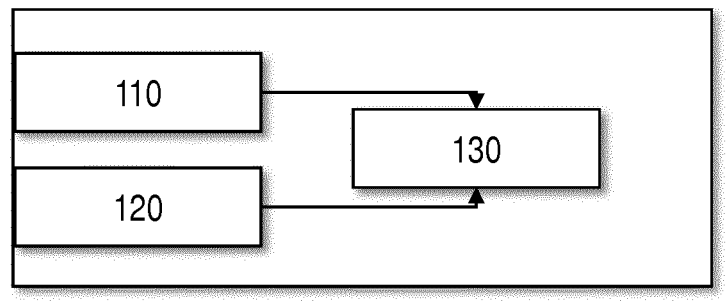
FIG. 5 schematically illustrates an embodiment of the system according to the present invention.

FIG. 5 schematically illustrates an embodiment of the system according to the present invention. The system may in particular be a GNSS receiver.

The illustrated system for determining a location using GNSS, comprises first receiving means 110 configured for receiving tracking signals from a GNSS satellite in a first set of frequency bands; second receiving means 120 configured for receiving respective correction signals from a base station in a second set of frequency bands; and processing means 130 configured to carry out the method described above on said tracking signals and said correction signals.

An alternative GNSS system may be configured to carry out the method for countering jamming, as described above. In that case, the processing means 130 is configured to carry out the method described above on said tracking signals received for said non-jammed frequency bands.

The functions attributed to the processing means of the system according to the present invention may be performed by programmable hardware components (e.g. general-purpose processors, DSPs, and the like) with appropriate software, configurable hardware components (e.g. FPGA), dedicated hardware components (e.g. ASIC), or any combination thereof. The same component(s) may also provide other functions.

The present invention also pertains to a computer program product comprising code means configured to cause a processor, when executed, to perform the steps of the method according to the present invention. The computer program product may, without limitation, comprise software stored on a computer-readable medium (such as an optical, magnetic, or semiconductor-based memory) or a downloadable software application.

It will now be described in more detail how GNSS measurements (pseudoranges, carrier phases, Doppler and CN0) at a certain carrier frequency may be inferred from measurements made at one or more other carrier frequencies.

The pseudorange and carrier phase measurements at two carrier frequencies $f_i$ and $f_k$ for a given GNSS satellite can be expressed as follows:

$$P_i = \rho + I_i + \delta P_i \qquad (1)$$

$$P_k = \rho + \frac{f_i^2}{f_k^2} I_i + \delta P_k$$

$$\varphi_i = \frac{f_i}{c} \rho - \frac{f_i}{c} I_i + N_i + \delta \varphi_i$$

$$\varphi_k = \frac{f_k}{c} \rho - \frac{f_k}{c} \frac{f_i^2}{f_k^2} I_i + N_k + \delta \varphi_k$$

In these equations, $P_i$ is the pseudorange at frequency i in meters, $\varphi_i$ is the carrier phase at frequency i in units of carrier cycles, $\rho$ is the satellite-to-receiver distance (and additional clock error terms that are not relevant to this invention), $N_i$ is the integer phase ambiguity, $I_i$ is the delay in the ionosphere at frequency $f_i$, in meters, $\delta P_i$ is the pseudorange bias, $\delta \varphi_i$ is the carrier phase bias, and c is the speed of light.

The ionospheric delay $I_i$ is typically on the order of a few meters. At maximum, it can reach up to 200 m under extreme ionospheric activity.

The pseudorange bias $\delta P_i$ is the sum of a satellite-dependent and a receiver-dependent bias. Both biases are typically at the meter level. The satellite-dependent bias can usually be compensated for using information contained in the navigation message transmitted by the satellite. After compensation, the residual satellite bias is reduced to a few decimeters. The receiver bias is common to all satellites, and typically cancels out in the position computation. Hence it is of no further concern in the present explanation.

The carrier phase bias $\delta \varphi_i$ is the sum of a satellite-dependent and a receiver-dependent bias. Only the fractional part of $\delta \varphi_i$ is relevant as the integer part is absorbed into the integer ambiguity $N_i$. The receiver-dependent bias typically cancels out in the position computation and is therefore not relevant to the invention, but the satellite-dependent phase bias is directly affecting the position algorithm if not compensated for.

By rearranging equations (1), one can express $\varphi_k$ and $P_k$ as follows:

$$\varphi_k = \varphi_i + \frac{f_k - f_i}{c} P_i - \frac{(f_k - f_i)^2}{c f_k} I_i + N_{ki} + \delta \varphi_{ki} \frac{f_k - f_i}{c} \delta P_i \qquad (2)$$

$$P_k = P_i + \left( \frac{f_i^2}{f_k^2} - 1 \right) I_i + \delta P_{ki} \qquad (3)$$

Where $N_{ki} = N_k - N_i$, $\delta \varphi_{ki} = \delta \varphi_k - \delta \varphi_i$ and $\delta P_{ki} = \delta P_k - \delta P_i$.

Equations (2) and (3) suggest that it is possible to derive the carrier phase and pseudorange at frequency $f_k$ from the carrier phase and pseudorange at frequency $f_i$ and the ionosphere delay.

The carrier phase at $f_k$ may be computed from the pseudorange and carrier phase at frequency $f_i$ using the following formula:

$$\widehat{\varphi_k} = \varphi_i + \frac{f_k - f_i}{c} P_i - \frac{(f_k - f_i)^2}{c f_k} I_i, \qquad (4)$$

where $\widehat{\varphi_k}$ is the derived carrier phase measurement. Several ways to obtain the ionospheric delay $I_i$ will be described below.

By combining (4) and (2), it can be shown that the difference between the true carrier phase measurement at frequency $f_k$ and the derived measurement at frequency $f_k$ is:

$$\Delta\varphi_{k,i} = \varphi_k - \widehat{\varphi_k} = N_{ki} + B_{k,i}, \text{ with} \quad (5)$$

$$B_{k,i} = \delta\varphi_{ki} - \frac{f_k - f_i}{c}\delta P_i \quad (6)$$

Figure 6:
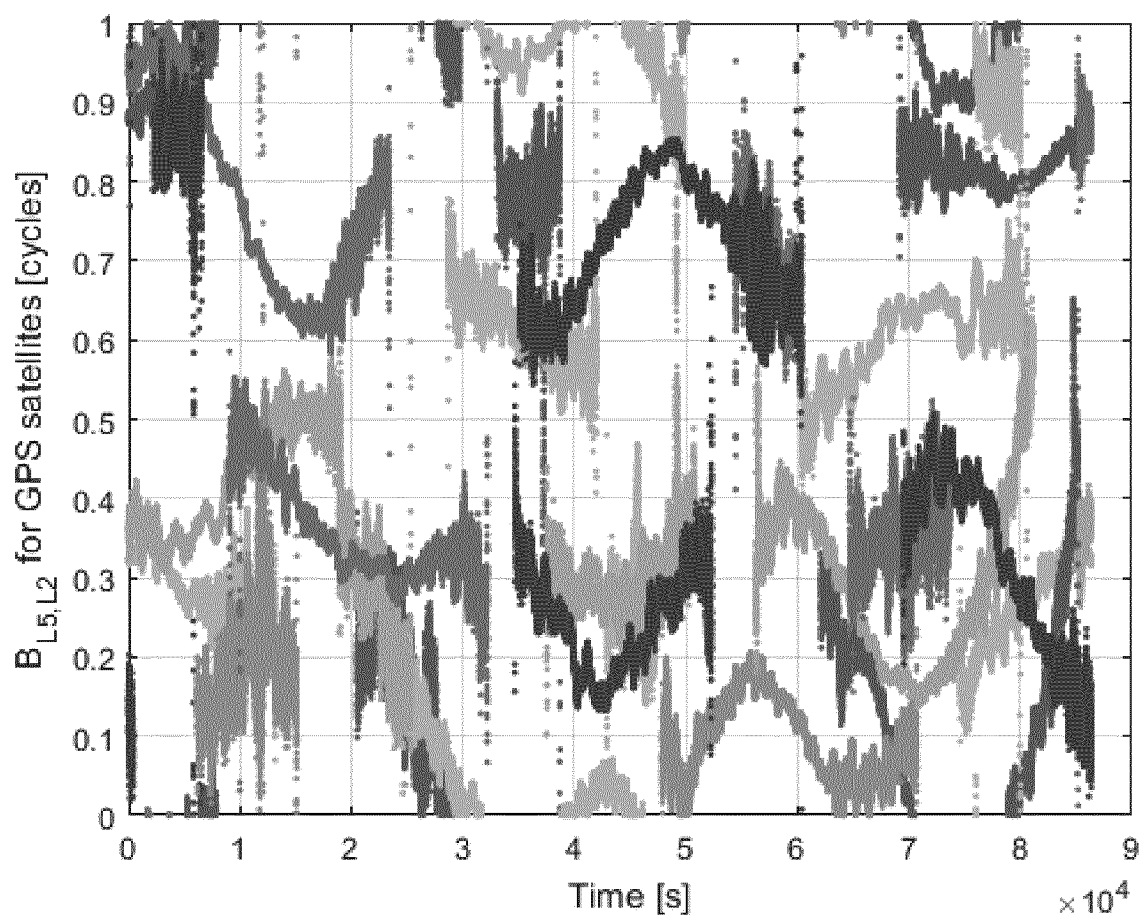
FIG. 6 presents values of the bias between true GPS L5 carrier phases, and GPS L5 carrier phases derived from GPS L2 carrier phases.

The difference between true and derived carrier phase measurements is the sum of an integer ambiguity term $N_{ki}$ and a bias term $B_{k,i}$. The ambiguity term is irrelevant as carrier phase measurements are always defined with an unknown integer ambiguity, but the bias term $B_{k,i}$ is not. $B_{k,i}$ is a value from 0 to 1, as any integer part is absorbed into the integer ambiguity $N_{ki}$. $B_{k,i}$ is often satellite-dependent or even variable in time. FIG. 6 shows, by way of example, the $B_{k,i}$ term corresponding to the case where GPS L5 measurements are derived from GPS L2 measurements ($B_{L5,L2}$) using (4).

FIG. 6 shows the $B_{L5,L2}$ value for all the GPS satellites observed during one day from a mid-latitude location. Each trace corresponds to the pass of a satellite. It can be seen that $B_{L5,L2}$ is different for all satellites, and is not constant over the satellite passes.

This satellite dependence makes it impractical to use (4) to derive carrier phase measurements, unless satellite-dependent effects are compensated for.

However, it appears that for some GNSS signals, $B_{k,i}$ is independent of the satellite. This is for example the case if the signals at frequency $f_i$ and $f_k$ are transmitted as a wideband modulation by the satellite. In that case, the derived carrier phase only differs from the true carrier phase by an integer number of cycles and a satellite-independent bias. The satellite-independent bias is undistinguishable from the receiver bias, and it therefore irrelevant in the positioning algorithm.

An example of signals transmitted in wideband modulation by the satellite is the E5a and E5b Galileo signals, at 1176.45 MHz and 1207.14 MHz respectively. By way of example, the $B_{E5a,E5b}$ term for all Galileo satellites observed during a full day from a mid-latitude location is plotted in FIG. 7.

Figure 7:
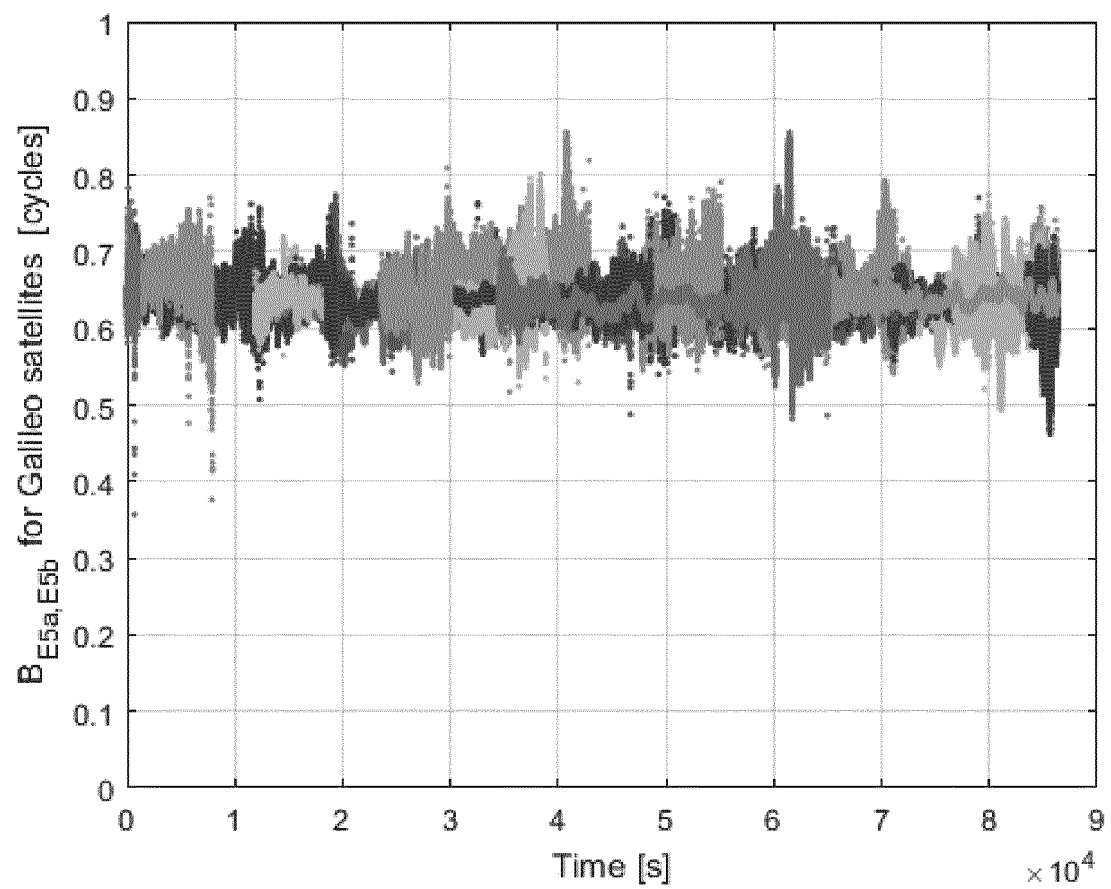
FIG. 7 presents values of the bias between true Galileo E5a carrier phases, and Galileo E5a carrier phases derived from Galileo E5b carrier phases.

Compared to FIG. 6, FIG. 7 shows that the predictability of E5a from E5b carrier phases is much better than the predictability of GPS L5 from L2. A global offset exists (about 0.63 cycles in FIG. 7), but such offset is inherent to carrier phase measurements and is of no concern to the positioning algorithm.

Formula (4) is especially interesting when the frequencies $f_i$ and $f_k$ are close to each other (separation <100 MHz, as for example is the case when the signals are part of an AltBOC modulation). This is because the coefficient of the $P_i$ and the $I_i$ terms is small in that case.

For example, if $f_i$ is the E5b frequency and $f_k$ is the E5a frequency, (4) becomes:

$$\widehat{\varphi_{E5a}} = \varphi_{E5b} - 0.1024 \cdot P_{E5b} - 0.00267 \cdot I_{E5b} \quad (7)$$

Showing that, when estimating the E5a carrier phase from the E5b measurements and the ionosphere delay, the sensitivity of the result to any error in the E5b pseudorange will be small (attenuated by a factor 0.1024), and the sensitivity to the ionospheric delay will be even smaller (factor 0.00267).

This means that it is not required to know the ionosphere delay with a great precision. By way of example, in (7), an error of 10 meters on $I_{E5b}$ will only contribute to an error of 0.0267 cycles on $\widehat{\varphi_{E5a}}$, which is negligible for most applications.

The ionosphere delay $I_i$ can be estimated in several ways. It can for example be obtained from the difference between two pseudoranges at two frequencies $f_i$ and $f_j$ ($f_j$ being typically different than $f_k$), using the following well-known formula:

$$I_i = \frac{f_i^2}{f_j^2 - f_i^2} \cdot (P_i - P_j) - BGD(f_i, f_j) \quad (8)$$

In (8), $P_i$ and $P_j$ are the pseudoranges at frequencies $f_i$ and $f_j$, and BGD( ) is an optional correction term transmitted by the satellite. For example, a receiver having measurements from the E5b and E1 Galileo frequencies could estimate the ionosphere delay $I_{E5b}$ using the pseudoranges on E5b (Pi) and E1 (Pj), and then use (7) to estimate the E5a carrier phase.

The accuracy at which $I_i$ can be determined using (8) is at the level of a few meters, which is more than sufficient considering the low scaling factor. Any receiver bias effect between the Pi and Pj pseudoranges will contribute to a global offset of the derived phase, and is irrelevant.

Other ways to obtain the $I_i$ delay at a level of accuracy suitable for the invention include using ionosphere maps, for example those transmitted by SBAS satellites, or applying models such as the Klobuchar model transmitted by the GPS satellites.

In one variant of the invention, the carrier phase at a frequency $f_k$ is obtained from the carrier phase at frequency $f_i$ and from the pseudoranges at frequency $f_i$ and $f_j$, using (8) and (4).

Pseudoranges can optionally be carrier-smoothed in a well-known manner in order to reduce the noise.

Figure 8:
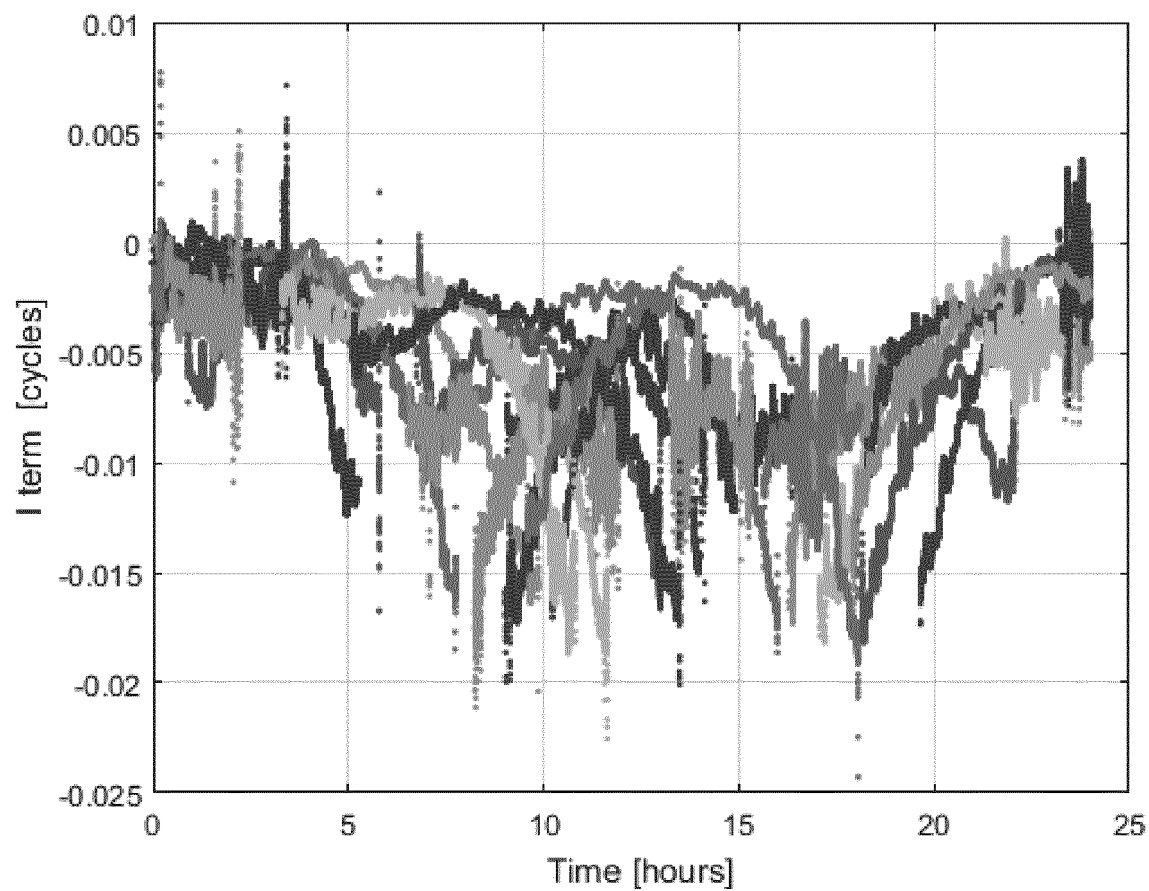
FIG. 8 presents values illustrating the effect of neglecting the ionospheric contribution.

Thanks to the low sensitivity to the ionosphere, it is even possible to ignore the $I_i$ term fully in (4). For example, FIG. 8 shows the contribution of the $I_i$ term to the derived carrier phase during a complete day for a mid-latitude station, when deriving E5a carrier phases from E5b carrier phases. The contribution increases a bit in the afternoon due to increased ionosphere activity, but remains at the level of a few hundredth of cycles all the time. It can therefore be safely ignored.

In another variant of the invention, the derived carrier phase measurement is computed solely from the code and carrier phase measurements of a single other frequency, preferably at a close frequency separation. In this case, $I_i$ is set to zero in (4).

It must be noted that the above derivation does not address the receiver-side phase wind-up effect explicitly. As phase wind-up is a common bias affecting all satellites in the same way, it is irrelevant to the positioning algorithm.

Starting from (3), a good estimator for the pseudorange at frequency $f_k$ from the pseudorange at frequency $f_i$ is:

$$\widehat{P_k} = P_i + \left(\frac{f_i^2}{f_k^2} - 1\right)I_i \quad (9)$$

The difference between the true pseudorange measurement at $f_k$ and the measurement derived using (9) is:

$$\Delta P_{k,i} = P_k - \widehat{P_k} = \delta P_{ki} \quad (10)$$

Figure 9:
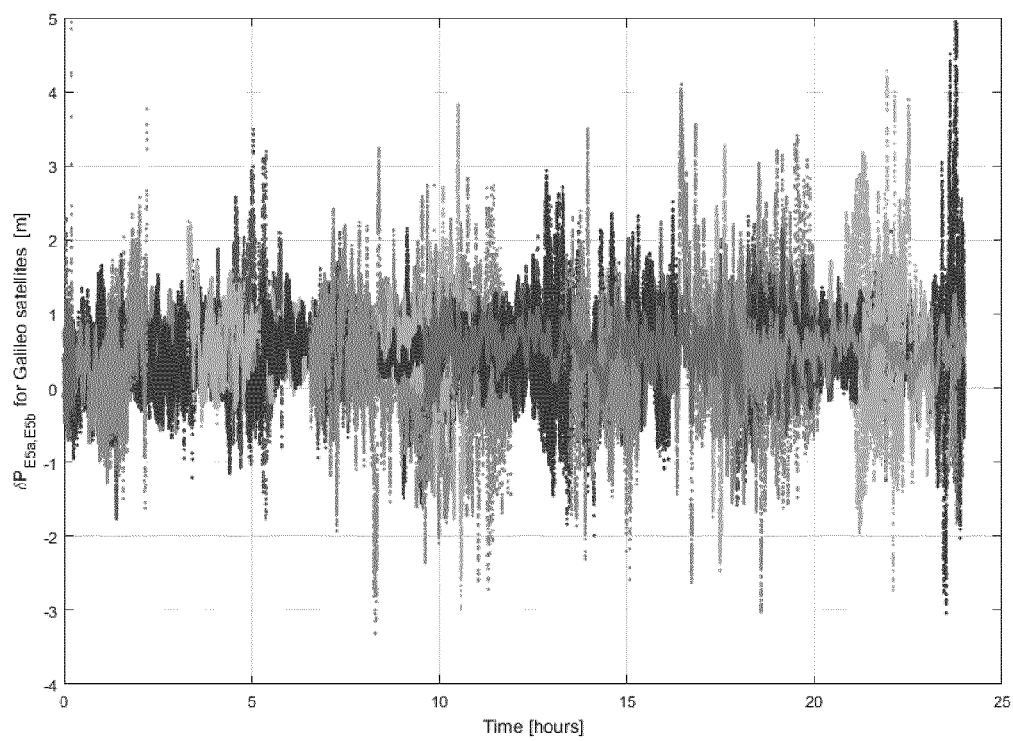
FIG. 9 presents values illustrating the difference between true E5a pseudorange and E5a pseudorange estimated from the E5b pseudorange.

The bias term $\delta P_{k,i}$ has a satellite-dependent component and a satellite-independent component. Only the satellite-dependent component is relevant here. It can be accurately compensated using the group delay information transmitted by the satellites. Alternatively, in the case of signals transmitted as wideband modulation, such as Galileo E5a, E5b and E5-AltBOC, $\delta P_{k,i}$ is largely independent from the satellite, and can therefore safely be neglected. The fact that $\delta P_{k,i}$ is satellite-independent is illustrated in FIG. 9. Each gray tint corresponds to a different satellite. Not noticeable satellite-dependent offset can be seen.

Formula (9) is especially interesting when the frequencies $f_i$ and $f_k$ are close to each other (separation <100 MHz, such as for example in the case of the Galileo AltBOC signals). This is because the coefficient of the $I_i$ term is small in that case.

For example, if $f_i$ corresponds to the E5b frequency and $f_k$ is the E5a frequency, (9) becomes:

$$\widehat{P_{E5a}} = P_{E5b} + 0.0529 \cdot I_{E5b} \quad (11)$$

As was the case for the carrier phase, equation (11) shows that the ionosphere-dependent term has only a limited effect on the result.

In a receiver according to the invention, the pseudorange at frequency $f_k$ may be computed using (9), with the $I_i$ value being computed by (8).

Some GNSS receivers also compute the Doppler at the different frequencies. Inferring the Doppler at frequency $f_k$ from the Doppler at frequency $f_i$ is well known in the art. It can be done using the following formula:

$$D_k = \frac{f_k}{f_i} D_i \quad (12)$$

As for the C/N0 value, it can usually safely be assumed that the CN0 is frequency independent, so that:

$$C/N0_k = C/N0_i$$

While the invention has been described hereinabove with reference to specific embodiments, this was done to clarify and not to limit the invention, the scope of which is determined by the accompanying claims.

The invention claimed is:

1. A method for recreating unavailable measurements in a global navigation satellite system (GNSS) receiver, the method comprising:
   receiving at least one tracking signal from a GNSS satellite in a first frequency band, the first frequency band including a target carrier frequency ($f_k$);
   receiving at least one correction signal providing at least one of an available pseudorange measurement ($P_i$) or an available carrier phase measurement ($\phi_i$) at another carrier frequency ($f_i$), wherein the another carrier frequency ($f_i$) is outside of the first frequency band; and
   without using any prior measurements from the GNSS satellite at the target carrier frequency ($f_k$), performing at least one of:
      deriving, from at least the available pseudorange measurement ($P_i$), a pseudorange estimate ($\hat{P}_k$) at the target carrier frequency ($f_k$); or
      deriving, from at least the available pseudorange measurement ($P_i$) and from at least the available carrier phase measurement ($\phi_i$), a carrier phase estimate ($\hat{\phi}_k$) at said target carrier frequency ($f_k$).

2. The method according to claim 1, wherein said deriving of said pseudorange estimate ($\hat{P}_k$) comprises adding to said pseudorange measurement ($P_i$) a first correction term that is a function of a ratio of said another carrier frequency ($f_i$) to the target carrier frequency ($f_k$).

3. The method according to claim 2, wherein said deriving of said carrier phase estimate ($\hat{\phi}_k$) comprises adding to said available carrier phase measurement ($\phi_i$) a second correction term that is a function of a difference between the target carrier frequency ($f_k$) and said another carrier frequency ($f_i$).

4. The method according to claim 3, wherein said second correction term includes at least one of:
   a first term that is a product of (i) the pseudorange measurement ($P_i$), (ii) the difference between the target carrier frequency ($f_k$) and said another carrier frequency ($f_i$), and (iii) an inverse of the speed of light (c); or
   a second term that is a product of (iv) an ionospheric delay ($I_i$) at said another carrier frequency ($f_i$), (v) a square of the difference between the target carrier frequency ($f_k$) and said another carrier frequency ($f_i$), and (vi) an inverse of a product of the target carrier frequency ($f_k$) and the speed of light (c).

5. The method according to claim 2, wherein said target carrier frequency ($f_k$) lies within 100 MHz from said another carrier frequency ($f_i$).

6. The method according to claim 2, wherein said first correction term is proportional to an ionospheric delay ($I_i$) at said another carrier frequency ($f_i$) and a factor defined as said ratio squared minus 1.

7. The method according to claim 6, wherein said deriving of said carrier phase estimate ((psi) comprises adding to said available carrier phase measurement ($\hat{\phi}_i$) a second correction term that is a function of a difference between the target carrier frequency ($f_k$) and said another carrier frequency (f).

8. The method according to claim 7, wherein said second correction term includes at least one of:
   a first term that is a product of (i) the pseudorange measurement ($P_i$), (ii) the difference between the target carrier frequency ($f_k$) and said another carrier frequency ($f_i$), and (iii) an inverse of the speed of light (c); or
   a second term that is a product of (iv) an ionospheric delay ($I_i$) at said another carrier frequency ($f_i$), (v) a square of the difference between the target carrier frequency ($f_k$) and said another carrier frequency ($f_i$), and (vi) an inverse of a product of the target carrier frequency ($f_k$) and the speed of light (c).

9. The method according to claim 1, wherein said deriving of said carrier phase estimate ($\hat{\phi}_k$) comprises adding to said available carrier phase measurement ($\phi_i$) a correction term that is a function of a difference between the target carrier frequency ($f_k$) and said another carrier frequency ($f_i$).

10. The method according to claim 9, wherein said correction term includes a term that is a product of:
    the available pseudorange measurement ($P_i$),
    the difference between the target carrier frequency ($f_k$) and said another carrier frequency ($f_i$), and
    an inverse of the speed of light (c).

11. The method according to claim 9, wherein said correction term includes a term that is a product of:
    an ionospheric delay ($I_i$) at said another carrier frequency ($f_i$),
    a square of the difference between the target carrier frequency ($f_k$) and said another carrier frequency ($f_i$), and
    an inverse of a product of the target carrier frequency ($f_k$) and the speed of light (c).

12. The method according to claim 1, wherein said target carrier frequency ($f_k$) lies within 100 MHz from said another carrier frequency ($f_i$).

13. The method according to claim 1, wherein an inter-frequency bias between a signal at said target carrier frequency ($f_k$) and a signal at said another carrier frequency (f) is satellite-independent.

14. The method according to claim 1, further comprising:
  determining a simulated correction signal using the pseudorange estimate and the carrier phase estimate; and
  determining a location parameter based on said at least one tracking signal and said simulated correction signal.

15. The method according to claim 1, wherein the available pseudorange measurement ($P_i$) is a first pseudorange measurement ($P_i$), the pseudorange estimate ($\hat{P}_k$) is a first pseudorange estimate ($P_i$), the available carrier phase measurement ($\phi_i$) is a first available carrier phase measurement ($\phi_i$), the carrier phase estimate ($\hat{\phi}_k$) is a first carrier phase estimate ($\phi_k$), and the another carrier frequency ($f_i$) is a first another carrier frequency ($f_i$), and further comprising at least one of:
  without using any prior measurements from the GNSS satellite at the target carrier frequency ($f_k$), deriving, from at least a second available pseudorange measurement ($P_j$), a second pseudorange estimate ($\hat{P}_k$) at said target carrier frequency ($f_k$); or
  without using any prior measurements from the GNSS satellite at the target carrier frequency ($f_k$), deriving, from at least said second available pseudorange measurement ($P_j$) and from at least a second available carrier phase measurement ($\phi_j$), a second carrier phase estimate ($\hat{\phi}_k$) at said target carrier frequency ($f_k$);
  wherein said second available pseudorange measurement ($P_j$) and said second available carrier phase measurement ($\phi_j$) are measurements at a second another carrier frequency ($f_j$), the second another carrier frequency ($f_j$) being different from said target carrier frequency ($f_k$) and different from the first another carrier frequency ($f_i$).

16. A non-transitory computer program product comprising machine-executable instructions that, when executed, cause a processor to carry out the method according to claim 1.

17. A method for recreating unavailable measurements in a global navigation satellite system (GNSS) receiver, the method comprising:
  receiving at least one tracking signal from a GNSS satellite in a first frequency band, the first frequency band including a first carrier frequency ($f_i$), the at least one tracking signal providing at least an available pseudorange measurement ($P_i$) at the first carrier frequency ($f_i$) and an available carrier phase measurement ($\phi_i$) at the first carrier frequency ($f_i$);
  receiving at least one correction signal in a second frequency band, the second frequency band including a target carrier frequency ($f_k$) and not including the first carrier frequency ($f_i$);
  without using any prior measurements from the GNSS satellite at the target carrier frequency ($f_k$):
    deriving, from at least the available pseudorange measurement ($P_i$), a pseudorange estimate ($\hat{P}_k$) at the target carrier frequency ($f_k$); and
    deriving, from at least the available pseudorange measurement ($P_i$) and from at least the available carrier phase measurement ($\phi_i$), a carrier phase estimate ($\hat{\phi}_k$) at said target carrier frequency ($f_k$);
  determining a simulated tracking measurement using the pseudorange estimate ($\hat{P}_k$) and the carrier phase estimate ($\hat{\phi}_k$); and
  determining a location parameter based on said simulated tracking measurement and said at least one correction signal.

18. The method according to claim 17, wherein the first frequency band is a non-lammed frequency band and the second frequency band is a lammed frequency band.

19. A system for determining a location using a global navigation satellite system (GNSS), the system comprising:
  first receiving means configured to receive at least one tracking signal from a GNSS satellite in a first frequency band, the first frequency band including a target carrier frequency ($f_k$);
  second receiving means configured to receive at least one correction signal providing at least one of an available pseudorange measurement ($P_i$) or an available carrier phase measurement ($\phi_i$) at a second carrier frequency ($f_i$), wherein the second carrier frequency ($f_i$) is outside of the first frequency band; and
  processing means configured to:
    (a) without using any prior measurements from the GNSS satellite at the target carrier frequency ($f_k$), derive, from said available pseudorange measurement ($P_i$), a pseudorange estimate ($\hat{P}_k$) at the target carrier frequency ($f_k$);
    (b) without using any prior measurements from the GNSS satellite at the target carrier frequency ($f_k$), derive, from said available pseudorange measurement ($P_i$) and said available carrier phase measurement ($\phi_i$), a carrier phase estimate ($\hat{\phi}_k$) at said target carrier frequency ($f_k$); or
    (c) both (a) and (b).

* * * * *